United States Patent [19]

Elias et al.

[11] Patent Number: 4,915,730

[45] Date of Patent: Apr. 10, 1990

[54] PROCESS AND APPARATUS FOR RECOVERY OF FLUE DUST

[76] Inventors: Allan Elias, HCR 34 Box 3, Pocatello, Id. 83202; Hans W. Rasmussen, 660 S. 400 East, St. George, Utah 84770

[21] Appl. No.: 379,691

[22] Filed: Jul. 13, 1989

Related U.S. Application Data

[63] Continuation of Ser. No. 133,245, Dec. 10, 1987, abandoned, which is a continuation of Ser. No. 777,207, Sep. 19, 1985, abandoned.

[51] Int. Cl.⁴ .......................... C22B 1/02; C22B 3/04; C22B 7/02
[52] U.S. Cl. ............................ 75/7; 75/25; 75/62; 75/71; 75/83; 75/101 R; 75/109; 75/113; 75/118 R; 423/27; 423/29; 423/34; 423/36; 423/46; 423/87; 423/109; 423/131
[58] Field of Search .............. 423/210 M, 210 R, 109, 423/103, 27, 87, 46, 34, 38, 322, 323; 75/120, 25, 118 R, 101 R, 113, 109

[56] References Cited

U.S. PATENT DOCUMENTS

| | | | |
|---|---|---|---|
| 2,264,337 | 12/1941 | Seguine et al. | 423/109 |
| 3,791,812 | 2/1974 | Frank et al. | 423/27 |
| 3,988,415 | 10/1976 | Barr | 423/22 |
| 4,092,152 | 5/1978 | Borbely | 75/25 |
| 4,124,462 | 11/1978 | Reinhardt et al. | 75/101 R |
| 4,389,378 | 6/1983 | McCorriston | 423/68 |
| 4,472,360 | 9/1984 | McCorriston | 423/68 |
| 4,475,993 | 10/1984 | Blander et al. | 75/25 |
| 4,524,049 | 6/1985 | Sit | 75/101 R |
| 4,576,812 | 3/1986 | von Hahn | 423/46 |

FOREIGN PATENT DOCUMENTS 22549 of 1902 United Kingdom.
1394024 5/1975 United Kingdom ................ 423/68

OTHER PUBLICATIONS

Babor, Basic College Chemistry, 2nd edition, Thomas Y. Crowell Company, New York, 1953, p. 256.

Primary Examiner—John Doll
Assistant Examiner—Lori F. Cuomo
Attorney, Agent, or Firm—Harris, Kern, Wallen & Tinsley

[57] ABSTRACT

A process and apparatus for the recovery of metals such as silver from phosphate flue dust. The process includes the steps of blending chloride salt and the flue dust to produce a blended material, roasting the blended material in an oxygen bearing atmosphere to oxidize carbon in the blended material producing a gas and to react chloride salt with the metal in the blended material producing a water soluble metallic salt, dissolving the metallic salt in water to produce a solution, filtering the solution to remove solids, and precipitating metals from the filtered solution with the precipitate ready for conventional smelting. The preferred embodiment of the apparatus includes a flue dust hopper and mill and a salt hopper and mill for feeding the dust and salt to a radiant tube dryer and a radiant tube asher for blending and roasting the materials, and a spray chamber at the outlet of the asher for separating solids and gases, where certain of the solids go into solution. The apparatus further includes a filter for removing the undissolved solids, a zinc feeder to add zinc to precipitate the dissolved silver, and a filter for removing the zinc-silver precipitate which is ready for smelting.

12 Claims, 2 Drawing Sheets

PROCESS AND APPARATUS FOR RECOVERY OF FLUE DUST

This application is a continuation of Ser. No. 07/133,245 filed Dec. 10, 1987, now abandoned, which is a continuation of Ser. No. 06/777,207 filed Sept. 19, 1985, now abandoned.

BACKGROUND OF THE INVENTION

This invention relates to processes and apparatus for the recovery of metals from phosphate flue dust.

The flue dusts typically are generated from the elemental phosphorous industry which processes phosphate rock to product phosphorous. Phosphate ore is crushed, mixed with a source of carbon, and introduced into electrical furnaces operating at high temperatures. The phosphate is reduced to elemental phosphorous and distilled from the furnace along with other volatile constituents in a gas stream. The phosphorous is condensed from this gas stream, with remaining metals in the gas stream being scrubbed in Cottrell electrostatic precipitators. This precipitator dust, now known as flue dust, contains precious metals, base metals and phosphates. This flue dust is the starting material for the process of the subject invention.

The metals contained in the precipitator dust, including arsenic and cadmium, and especially silver, do not respond to conventional hydrometalurgical or pyrometallurgical recovery schemes, with a maximum recovery of silver in the order of 25-35%. However, after the precipitator dust is processed pursuant to the teachings of the subject invention, metals readily respond and the recovery is substantially improved.

SUMMARY OF THE INVENTION

The process includes blending a salt intimately with the flue dust. This can be accomplished by a variety of methods, including but not restricted to pug mills, ribbon blenders, mullers, etc. The blender step should result in an intimate mixture of the flue dusts with the salt, which can be added as a saturated solution or as a powder or granules.

The blended material is then calcined or roasted typically at 1100° F. plus or minus 100° F., for a period of ten to fifteen minutes. The parameters governing retention time and temperature of the roast are established by the physical nature and content of the blended material. The finer the material and the lower the moisture content, the more rapid the roasting step, with finely divided material being fully reacted in as little as five minutes. This allows for a substantial reduction in the temperature required, with the lower limit apparently 700° F.

During the calcining or roasting, the carbon content of the flue dust is oxidized and is carried away as a gas, while the salt forms essentially carbon-free water soluble compounds with the metals in the flue dust.

The specific apparatus used in calcining does not appear to be a factor as long as the chemical requirements are adhered to. Tests runs with rotary kilns have given as good as results as dead roasts, or dead roasts with rabbling such as Herschoff type furnaces. Fluidized bed or flash roasting would also be satisfactory, as long as the chemical requirements are satisfied.

The calcined material is transferred to conventional leach circuits or can be heap leached for the silver and other metals. The calcined material including the metallic salts, will now readily respond to recovery of the silver and other metals such as gallium, cadmium, etc., by a variety of methods, such as cyanide, thiosulphate, thiourea, brine 8water), etc., with near complete recovery occurring within 15 minutes. Silver recoveries from 90% to 98% are the norm after calcining.

After extraction of the silver and other metals, the resultant tails may be used as a fertilizer. Enhancement of the solubility of the phosphates cam be achieved by pugging the tails with sulphuric or phosphoric acid, and drying at 300° F. This treatment renders most of the remaining phosphates water soluble and makes an excellent fertilizer product.

Accordingly, it is an object of the present invention to provide a new and improved process and apparatus for the recovery of metals, including silver, from phosphate flue dust such as the type generated by the elemental phosphorous industry. It is a particular object of the invention to provide such process and apparatus which will provide a substantial improvement in the quantity of metal recovered from flue dust.

It is a further object of the invention to provide a process and apparatus in which the carbon content of the flue dust is eliminated by oxidation and in which the metal content is converted into water soluble salt during the carbon oxidation step. An additional object is to provide for a separation of the metallic salt solution from the solids, with the solids being recoverable for subsequent use. An additional object is to provide for selective precipitation of metals from the solution to obtain metal precipitates which are readily handled by conventional smelting procedures.

It is another object of the invention to provide such a process and apparatus wherein barren solution from the precipitation step may be recirculated to the solution forming chamber and the salt may be recovered from the barren solution for reuse in mixing with the input flue dust.

Other object, advantages, features and results will more fully appear in the course of the following description.

DESCRIPTION OF THE PREFERRED EMBODIMENTS

Figure 1:
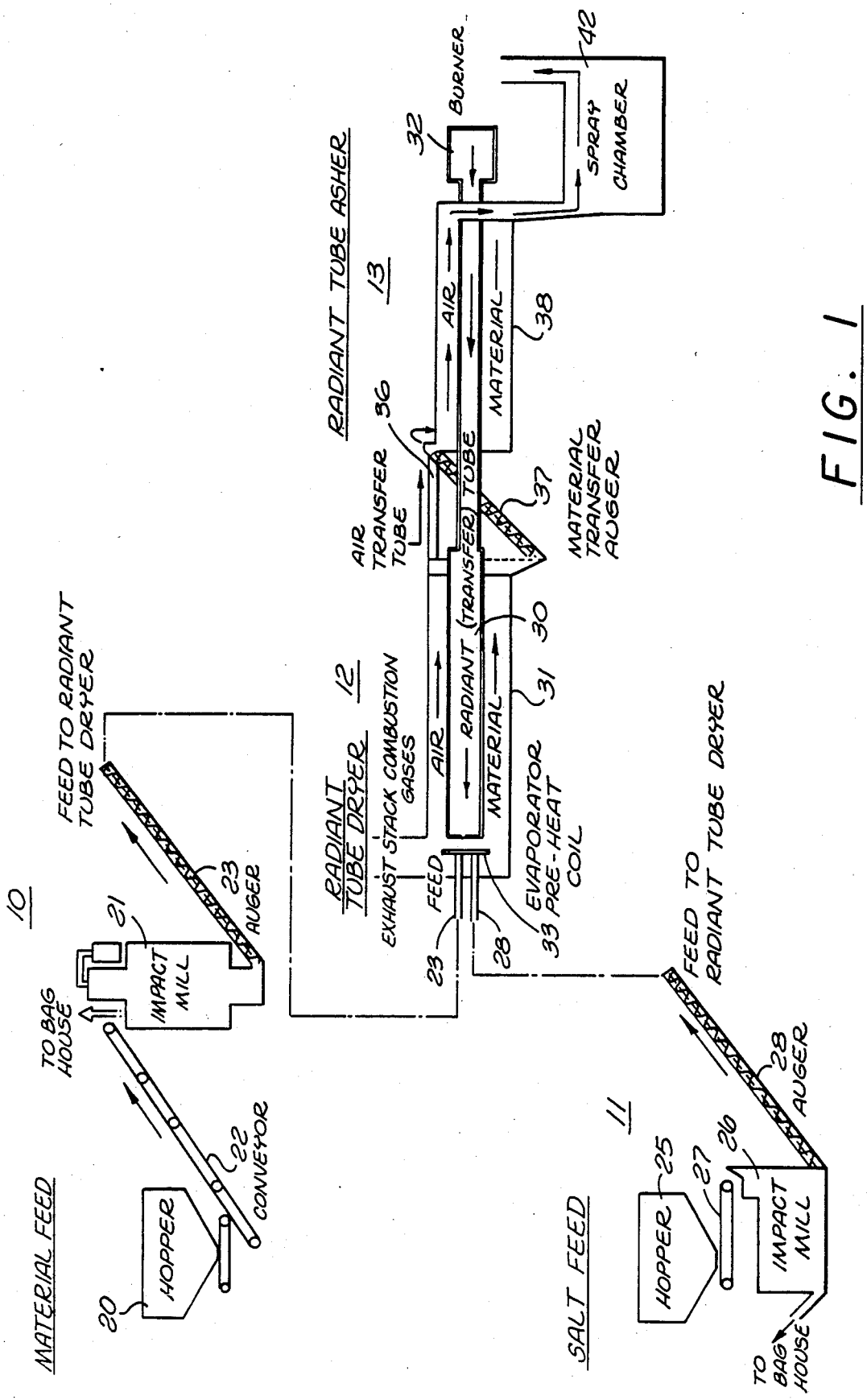
FIG. 1 is a flow chart illustrating the initial portion of a process and apparatus for recovery of metals and incorporating the presently preferred embodiment of the invention.

The process of the invention includes blending the precipitator dust and a chloride salt, calcining the blended material to an ash, leaching the calcined material, filtering the solids from the silver bearing solution, precipitating the silver from the solution and smelting the resultant precipitate. The various steps and the apparatus associated therewith are shown in the drawings, including the material feed 10, the salt feed 11, the radiant tube dryer 12, the radiant tube asher 13, the leaching circuit 14, the precipitation circuit 15, and the solution recirculation and salt reclamation 16.

The grinding and mixing step includes grinding the precipitator or flue dust to a uniform particle size and blending in a source of chloride, preferably sodium chloride, with the ground dust. The mechanics of the blending operation may include any device which will cause an intimate mixture of the precipitator dust and salt.

The chloride may be added as a saturated solution, as a granule, or as a powder. In view of the ashing circuit which follows, the most desirable constituents for blending are finely divided material and powdered chloride salt (approximately 7%) with little or no moisture content. Other sources for the chloride include potassium chloride, calcium chloride, magnesium chloride, and even hydrochloric acid.

The blended material is then placed in the ashing circuit for the removal of the carbon from the material and the completion of the chemical reaction between the metals in the precipitator dust and the chloride in the salt. These results can be accomplished by raising the temperature of the blended material to about 1100° F. for a period from 10–15 minutes. The temperature and retention time are variable, depending upon the particle size and moisture content of the blended material, the sufficiency of the source of oxygen used for the removal of carbon, and how the material is turned during heating so that all heated particles are exposed to the oxygen.

The heat source should be indirect, otherwise the force of the combustion gases will prematurely blow out a considerable amount of the fine material. To that end, calciners, fluidized beds, or Herschoff rabbling furnaces may be used. However, test runs indicate that the most desirable heat source in an indirect radiant tube burner.

The burner flame directed by the burner head is elongated and contained inside a radiant metal tube. The tube is fastened inside a refractory lined kiln, with the tube and the kiln rotating together. The kiln is fitted with lifters and the material fed into the kiln cascades over the hot radiant tube. A fan at the egress side controls the amount of oxygen drawn over and through the material. When the carbon has been removed and the chemical reaction between the metals and the chloride is complete, the material is ready to be pulped by mixing with water to dissolve the metallic salt. The kiln is mounted with the right or outlet end below the inlet end for gravity movement of the material through the kiln.

The pretreated material is then placed into a conventional leach circuit, tank or heap, for the recovery of the precious and base metals. The metals will now readily respond to treatment by cyanide, thiosulphate, thiourea, brine (water), etc., with metal recoveries ranging from 90% to 98%.

After filtering, the pregnant solution is precipitated by the Merrill-Crow zinc recovery system or the carbon adsorption method, and the barren solution is recycled. The tails are ready for further processing.

After extraction of the metals, the resultant tails may be used as fertilizer. Enhancement of the solubility of the phosphates in the tails can be achieved by pugging the tails with sulphuric or phosphuric acid and drying at 300° F. This treatment renders most of the remaining phosphates in the material water soluble and makes an agricultural fertilizer product.

Figure 2:
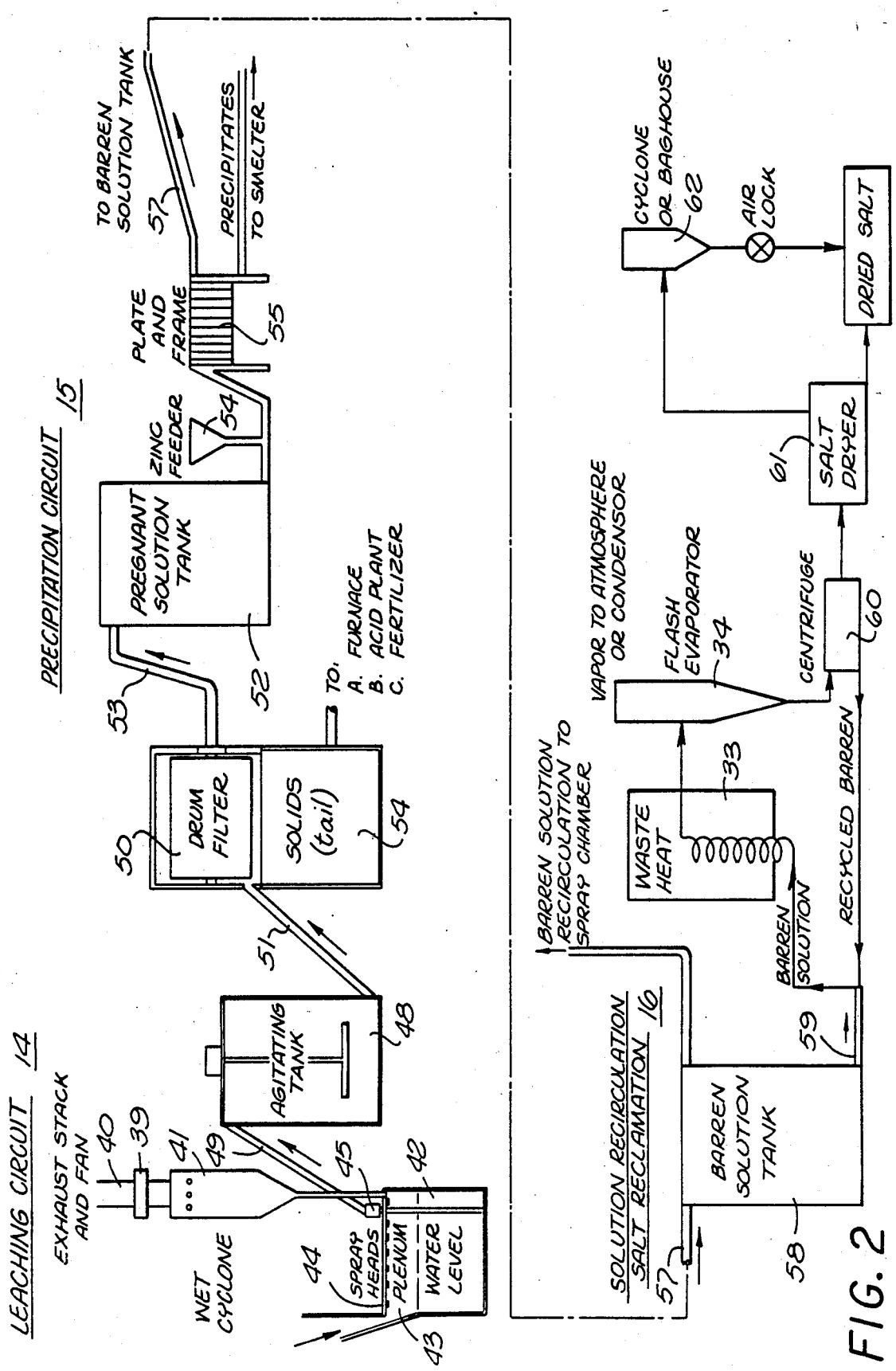
FIG. 2 is a similar flow chart illustrating the latter portion of the process and apparatus of FIG. 1.

Referring to the specific embodiment shown in FIGS. 1 and 2, the material feed unit 10 includes a hopper 20 and an impact mill 21, with material fed from the hopper to the mill by a conveyor 22, and from the mill to the dryer 12 by an auger 23.

The elemental phosphorous plants which produce the flue dust by product used as the raw or starting material for the present invention have varying methods of emptying their precipitators, ranging from vibration, a dry method, to continuous washing, a wet method.

The moisture content of the blended material should not exceed approximately 15% to facilitate proper functioning of the grinding equipment. No moisture in the blended material is preferred. However, the flue dust is hydroscopic and usually acquires a moisture content of about 10% to about 15%. The flue dust is fed to the impact mill 21, and the material is reduced to a maximum particle size of about minus 16 mesh. The smaller particle size speeds up the ashing process to follow. The material is fed to the radiant tube dryer 12 where it is mixed with powdered salt.

In the salt feed unit 11, salt is stored in a hopper 25 and is fed to an impact mill 26 by a conveyor 27. The powdered salt is fed from the mill to the dryer 12 by another auger 28. The salt has been reduced in particle size to about minus 100 mesh in order to enhance the initimate blending of the sodium chloride with the flue dust. Powdering of the salt reduces the amount of sodium chloride additive needed by approximately 5% to 10%. However, a greater amount of salt additive in a larger particle size does not affect subsequent metal recovery even through costs of recovery would obviously be higher.

Flue dust from the wet method of recovery is in a slurry with a high water content. With the raw material in this form, the salt is added to water and the salt solution is introduced into the raw material by means of a pug mill with an overhead spray. Several other pieces of equipment could accomplish the same blending of the raw material slurry with the saline solution. Two examples are ribbon blenders and mullers. The blended wet material is fed to the radiant tube dryer 12. As the moisture is drawn off the material, the slurry begins to form balls of various size about up to 3 inches. To counteract this development and to reduce the material to a particle size conducive to ashing, one of two steps needs to be introduced:

(1) the radiant tube dryer is fitted with a milling section, approximately three feet long, with rods or balls or a similar device, preferably located at the discharge end of the dryer to function as a continuous indirect drying and grinding device, or (2) at the transfer point between the radiant tube dryer 12 and the radiant tube asher 13, the hot material is fed to am impact or hammer mill or set of rolls or the like, and the particle size is reduced prior to ashing.

Whether the material feed is wet or dy, the dryer 12 is an economical way of heating the blended material through the efficient use of the off gases discharged from the radiant tube asher or calciner 13. By expanding the size of the radiant tube 30 from 12 inches in the asher to 30 inches in the dryer, the transfer of heat to the material in the dryer is greatly improved. The rotating outer tube 31 of the dryer is fitted with lifters and the material is made to cascade over the hot inner tube 30 exposing the blended flue dust to heat and oxygen while maintaining or reducing its particle size. The material is moved through the dryer counterflow to the heat from the burner 32, and the rate of advance and retention time of the material is dependent on the amount of moisture in the feed. Dry feed should be expected to exit the dryer in approximately 10 minutes at an approximate temperature of 700° F. Desirably an evaporator preheat coil 33 (see item 16, FIG. 2) is positioned at the back of the dryer, providing an efficient method of raising the temperature of the "blow-off" barren solution to approximately 185° F. prior to its introduction into the evaporator-crystallizer 34 for the recovery of the salt in solution.

An air transfer tube 36 provides for air flow from the dryer 12 to the asher 3 and an auger 37 provides for powdered material transfer from the dryer to the asher. In an alternative configuration, a separate air supply can be provided for the asher 13.

The outer tube 38 of the asher 13 is refractory lined and rotates along with the radiant tube 30. The radiant tube burner 32 is capable of firing a flame the length of the asher, typically 36 feet. Lifters are fastened to the refractory lining and cascade the material through the steady stream of air made available by the fan 39 located in the stack 40 over the cyclone 41 and spray chamber 42 (see leaching circuit 14, FIG. 2). In this environment the following two reactions occur: (1) the carbon which once saturated the flue dust and held captive the metals therein is oxidized and removed as a gas, and (2) the metals and the salt now form metallic chlorides.

For a material feed rate of four tons per hous with maximum moisture content of about 10 to 5 percent, cascading over a radiant tube of 30 inch diameter by 30 feet long in the radiant tube dryer and then moving over a radiant tube of 12 inch diameter by 36 feet long in the radiant tube asher, it has been found that the burner should be selected to provide approximately 4,000,000 BTU per hour.

The ashed or calcined material exits the radiant tube asher 13 and falls into a sub-floor level spray chamber 42, which chamber includes an air plenum 43 above the water level, spray heads 44, and a pump 45. The solid material exiting from the radiant tube asher falls into the water contained in the spray chamber, while the air and the fine particulate matter carried therein enters the plenum chamber above the water level. The air stream is first slowed and then cooled and cleaned by the water from the spray heads. The air stream is then drawn up by the exhaust fan through the wet cyclone 41, preferably fitted with additional spray heads, and the clean air stream with the carbon oxides is then released through the stack to the atmosphere. The particulate material separated in the cyclone falls into the tank 42. The pump 45 in the spray chamber sends the solids in solution, a slurry, to one or more leach tanks 48 through a line 49.

To a great degree the metals are immediately soluble as chlorides and require agitation only and not leaching in the conventional sense. To insure that available metals stay in solution, one of several carrier methods may be used; e.g., (1) change the Ph of the material to 1 (one) and add thioures, (2) change in the Ph to 11 by the addition of approximately 2% calcium oxide by weight and add a 2 pound solution of sodium cyanide with pulp density of approximately 30%, (3) change the Ph to 5 by the addition of acetic acid and add thiosulphate, or (4) maintain a brine solution with sufficient salinity.

The slurry is pumped from the tank 48 to a drum filter 50 through line 51. Filtering characteristics of the slurry are excellent at all Ph levels. It is recommended that the knife discharge of the filter be employed at a constant setting of approximately ½ inch back from the drum, enabling a layer of material to adhere to the filter and act as a pre-coat for ultimate clarity of solution. The clear pregnant solution from the filter is pumped to the pregnant solution tank 52 via a line 53 to await precipitation. The solids or tails accumulate in a container 54 below the drum and may be disposed of in one of the ways discussed below.

The pregnant solution containing the metallic chloride is pumped from the tank 52 to the zinc feeder 54 where metallic zinc is added to the solution in an amount stoichometric with the silver, with approximately one minute retention time. The metals in solution, chiefly arsenic, cadmium and silver, ar reduced and are trapped in the plate and frame filter 55 which follows. The metallic silver precipitates from the filter 55 may then be sent to a refinery for conventional smelting. The metal to be added, here the zinc, needs to be more electropositive than the metal to be recovered, here the silver. Another metal which works in some situations is copper. The barren solution from the filter is pumped via a line 57 to the barren solution tank 58 for recirculation.

For the specific example set out below, recycling of the barren solution to the spray chamber 43 requires a "blow-off" of water of approximately 150 gallons per hour and the subsequent crystallization of approximately 600 pounds of salt per hour. This is accomplished as follows: A portion of the barren solution is withdrawn through a line 59 and preheated in the 2 inch stainless steel coils of the evaporator 33 placed inside the radiant tube dryer 12, and then pumped to the evaporator-crystallizer 34, dewatered in a centrifuge 60, and the cake dried in a dryer 61. The resultant salt is returned to the salt hopper 25 and reintroduced into the system. The vapor from the dryer 61 may be sent to a cyclone 62 for further recovery of dried salt. The water vapor from the evaporator 34 as well as from the cyclone 62 may be distilled or allowed to escape into the atmosphere.

The remaining solids comprising the filter cake from the drum filter 50 are chiefly composed of phosphates and minor amounts of zinc, and may be economically disposed of in one of the following manners:

(A) The remaining solids may be reintroduced into the elemental phosphorous furnaces for the recovery of the phosphorous contained therein.

(B) The remaining solids may be transported to a liquid fertilizer plant where the phosphates may be extracted as phosphoric acid.

(C) The remaining solids may be pugged with sulphuric acid, approximately 10% by weight, and then dried, which renders the phosphates and the zinc contained therein water soluble and an excellent soil additive for zinc deficient soils.

The following operating data is applicable to a 4 ton per hour process rate:

|  | APPROXIMATIONS |
|---|---|
| Material Feed: | 7,400 lbs. |
| Salt Feed: | 600 lbs. |
| Assumed Moisture: | 10% |
| Ashing Retention Time: | 20 minutes |
| Flame Temperature Radiant Tube: | 1,750° F. |
| Exhaust Gas Temperature: | 400° F. |
| Oxygen Air Flow: | 5,000 cfm |
| Pulp Density: | 30% |
| Pump Rates: | 35 gpm |
| Silver Recovery: | 95% |
| Arsenic Recovery: | 75% |
| Cadmium Recovery: | 60% |

We claim:
1. A process for recovery of metals from phosphate flue dust which contains carbon, wherein the metals are selected from the group consisting of silver, gallium, arsenic and cadmium, including the steps of:
 blending a solid chloride source and the flue dust to produce a blended material;
 roasting the blended material in an oxygen bearing atmosphere to oxidize carbon in the blended material producing a gas, and to react the chloride with the metal in the blended material producing water soluble metallic salt solids,
 said roasting step including cascading said blended material over a heat source in the presence of air, and moving said blended material and air along said heat source;
 dissolving the metallic salt solids in water to produce a first solution, said water including cyanide in solution;
 filtering the first solution to remove any remaining solids to form a filtered pregnant solution; and
 precipitating metals from the filtered solution.

2. The process as defined in claim 1 wherein said chloride source is sodium chloride.

3. The process as defined in claim 1 wherein said chloride source is potassium chloride.

4. The process as defined in claim 1 wherein said blending step includes cascading the flue dust and said chloride over a heat source, and moving said dust and chloride along said heat source.

5. The process as defined in claim 4 wherein said blending step includes grinding said flue dust to about minus 16 mesh and grinding said chloride to about minus 100 mesh to provide powdered dust and chloride.

6. The process as defined in claim 5 wherein said blending step includes maintaining the moisture content of said blended material at the start of said blending step at no more than about 10% to about 15%.

7. The process as defined in claim 1 wherein said precipitating step includes adding to said filtered solution a metal which is more electro-positive than the metals to be recovered to form a metal precipitate.

8. The process as defined in claim 1 wherein said precipitating step includes adding zinc to said filtered solution to form a metal precipitate.

9. The process as defined in claims 7 or 8 including separating said precipitate to leave a barren solution, and recirculating said barren solution to use in said dissolving step.

10. The process as defined in claim 9 including treating a portion of said barren solution to remove salt including the steps of:
 heating said portion of said barren solution;
 flash evaporating said heated portion to provide a residual;
 separating said residual into a solid component and a solution component; and
 recycling said solution component.

11. A process for recovery of silver from phosphate flue dust which contains carbon, including the steps of:
 blending sodium chloride and the flue dust to produce a blended material;
 roasting the blended material in an oxygen bearing atmosphere to oxidize carbon in the blended material producing a gas, and to react the chloride with the silver metal in the blended material producing water soluble metallic salt solids, said roasting step including cascading said blended material over a heat source in the presence of air, and moving said blended material and air along said heat source;
 dissolving the metallic salt solids in water to product a first solution, said water including sodium cyanide in solution;
 filtering the first solution to remove any remaining solids to form a filtered pregnant solution;
 precipitating metals from the filtered solution by adding zinc to said filtered solution to form a silver precipitate;
 separating said precipitate to leave a barren solution; and
 recirculating said barren solution to use in said dissolving step.

12. The process as defined in any of claims 1–3, 4–6, 7, 8, or 11 wherein said roasting step is carried out within the temperature range of about 1000° F. to about 1200° F.

* * * * *